Dec. 7, 1954

E. D. SCHLAPHOFF 2,696,272

FOLDABLE TWO-WHEELED MOTOR VEHICLE

Filed Oct. 27, 1950

Inventor
Erwin D. Schlaphoff

Attorneys

Dec. 7, 1954  E. D. SCHLAPHOFF  2,696,272
FOLDABLE TWO-WHEELED MOTOR VEHICLE
Filed Oct. 27, 1950  3 Sheets-Sheet 2

Inventor
Erwin D. Schlaphoff
By
Dodge and Sons
Attorneys

Dec. 7, 1954 E. D. SCHLAPHOFF 2,696,272
FOLDABLE TWO-WHEELED MOTOR VEHICLE
Filed Oct. 27, 1950 3 Sheets—Sheet 3

Inventor
Erwin D. Schlaphoff
By
Dodge and Sons
Attorneys

United States Patent Office 2,696,272
Patented Dec. 7, 1954

2,696,272

FOLDABLE TWO-WHEELED MOTOR VEHICLE

Erwin D. Schlaphoff, Waverly, Nebr.

Application October 27, 1950, Serial No. 192,472

6 Claims. (Cl. 180—33)

This invention relates to a motor vehicle which is capable of being conveniently stored in a small space. Specifically, it relates to a motor scooter which may be converted from a normal operating position to a compact folded position.

The invention was conceived to meet the need for a portable vehicle which could conveniently be carried in a private plane, boat or even in an automobile. The need for such a vehicle is particularly great if the useful range of the primary means of transportation is dependent upon the presence of terminal facilities such as docks and airports. The latter are commonly located at points remote from the traveler's destination, and a vehicle of this type will make it unnecessary for the traveler to depend upon someone else to meet him or upon the availability of public transportation facilities.

The solution of the problem presented by the need for such a vehicle involves a resolution of the conflicting characteristics of the vehicle as stored and the vehicle as used. It is, of course, necessary that the vehicle be strong enough so that its operation is safe and at the same time it must be light enough so that it is easily portable, and small enough so it does not take up a large amount of storage space.

The vehicle constructed according to the present invention is believed to afford a practical solution to this problem. The frame of the vehicle is constructed of tubular members because such members are characterized by high strength per unit of weight. While it is possible that the frame could be made of other structural shapes such as angle iron or channel iron, the use of tubular stock is preferred because of the above mentioned characteristic.

The frame has two portions which are connected by a hinge so that they may be swung relatively to one another between a folded position and a normal operating position. The conformation of these two portions is such that a compact portable unit is afforded. The amount of space taken up by this unit is kept to a minimum by so dimensioning the component parts relatively to each other that little or no void space is present when the vehicle is folded. The contour of the folded vehicle is such that it has no projecting parts which would needlessly consume storage space which might otherwise be available.

A preferred form of the invention is illustrated in the accompanying drawings, in which.

Figures 1, 6:
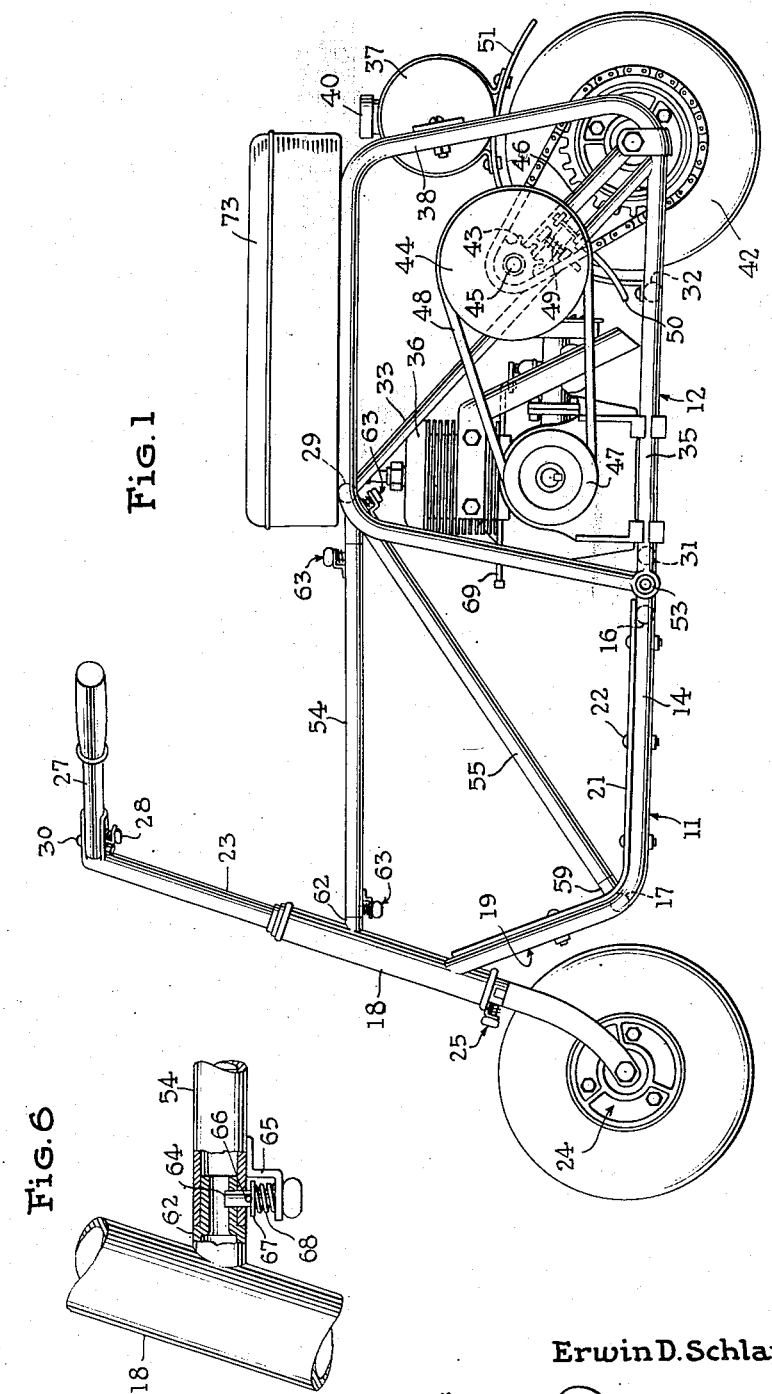
Fig. 1 is a side elevation of the motor scooter in its normal position.
Fig. 6 is a detail view partly in section of a preferred form of latch means whereby the strut members are held in place.
Figure 2:
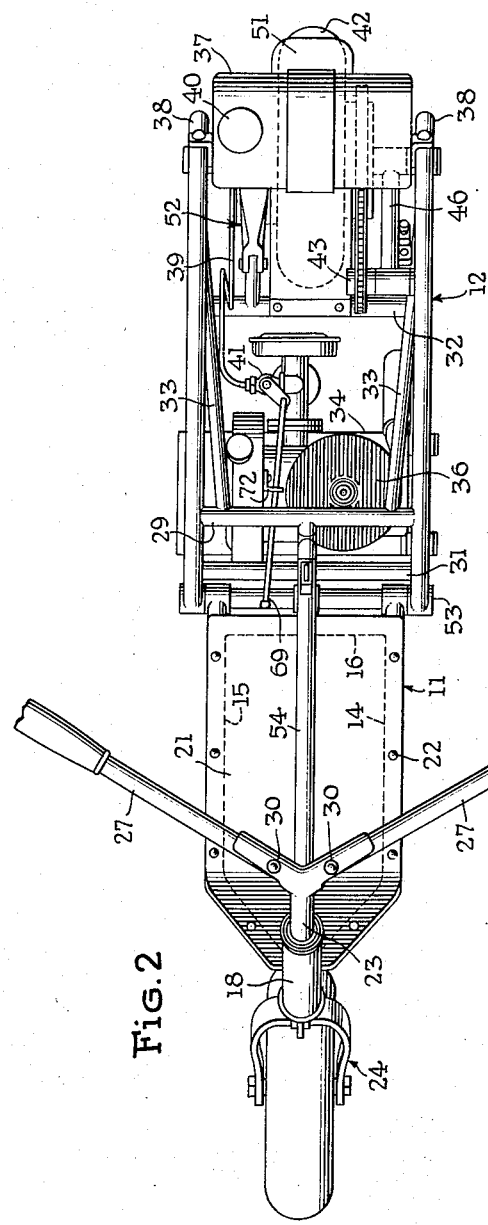
Fig. 2 is a top plan view of the device shown in Fig. 1, some parts being broken away.

The motor scooter frame has a front portion 11 and a rear portion 12. The front portion 11 comprises a central longitudinal member 13 and longitudinal side members 14 and 15. These longitudinal members extend from a transverse member 16 and are attached to a steering head 18. An intermediate transverse member 17 is attached to the longitudinal members 13, 14 and 15, and serves to strengthen the forward end of the portion 11.

Figure 7:
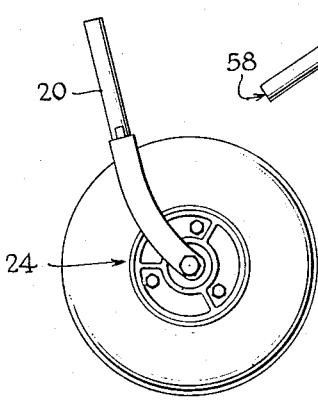
Fig. 7 is a side elevation of the front wheel and fork assembly.

The front portion 11 turns upward as generally indicated at 19. A platform 21 is secured to the side members 16 and 17 by any suitable means such as bolts 22. A steering column 23 is journaled in the steering head 18. A fork and wheel assembly 24 is releasably fastened to the lower end of the column 23 by latch means 25. As shown in Fig. 7 the assembly 24 is provided with stub 20 which fits into the lower end of the steering column 23.

Handle bars 27 are provided at the upper end of the steering column 23. The handle bars are arranged to swing about the hinge axes 30 which are substantially parallel with the axis of the column 23. The handle bars are spread apart in their operating position, and are held in place by latches 28. They may swing to a non-operating position in which they are approximately parallel with each other.

The tubular members which make up the frame of the rear part 12 define the margins of a generally box-like openwork structure. The side surfaces of this openwork structure are generally trapezoidal in form and are joined by transverse members 29, 31, 32. Diagonal braces 33 extend from the member 29 to points near the lower rear corners of the portion 12. A bed plate generally indicated by the numeral 34 is clamped to the lower side frame members 35. An internal combustion engine 36 is mounted upon the bed plate 34. A fuel supply tank 37 is secured to the upward extending rear members 38. The fuel cap 40 is provided with a vent valve which operates to permit the entrance of air into the tank 37 and to prevent the escape of fuel therefrom. A fuel line 39 leads from the tank 37 to the engine 36. A valve 41 controls the flow of fuel through the line 39.

Figure 3:
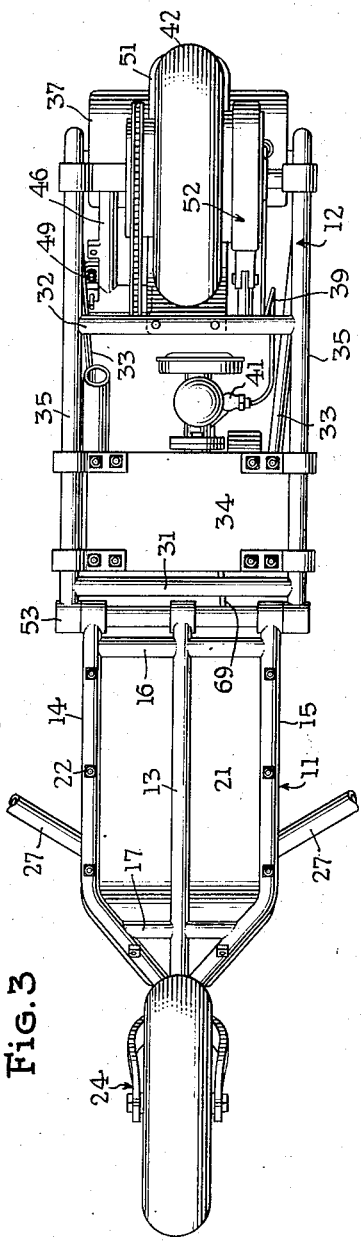
Fig. 3 is a bottom view, some parts being broken away.

A rear road wheel 42 is carried at the lower rear margin of the portion 12. The wheel 42 is chain-driven from an idle sprocket 43. The idle sprocket 43 and an idle pulley 44 are carried by a stub shaft 45 which is mounted in a journal at the end of the angularly movable member 46. A drive pulley 47, carried by the engine crankshaft, is connected with the idle pulley 44 by a V-belt 48. The tension in belt 48 is controlled by the angular position of the member 46. The member 46 is biased by a spring 49 toward its belt-tightening or driving position. As is clearly shown in Figs. 1 and 3, the spring 49 reacts between lugs carried by the members 46 and 33. The position of the member 46 can be controlled in any conventional manner as, for example, by a Bowden wire device, part of which is indicated at 50, leading from the handle bars 27 to the member 46. It will be apparent that any conventional clutch could be substituted for the type illustrated.

A mud guard 51 is secured to member 32 and to the fuel tank 37. The rear wheel is provided with a brake generally indicated at 52. This brake 52 may be controlled by a Bowden wire, not shown, leading to the handle bars 27 or by any other conventional means. The engine throttle may be controlled in any conventional way, not illustrated, such as by the familiar twist handle bar grip.

Figure 4:
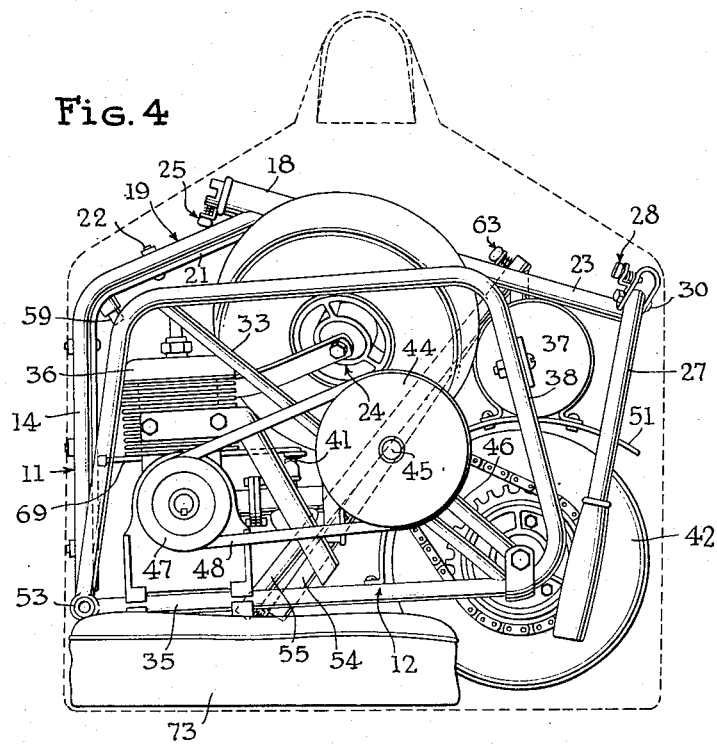
Fig. 4 is a side elevation of the device in its folded position and showing a carrying case in dotted lines.
Figure 5:
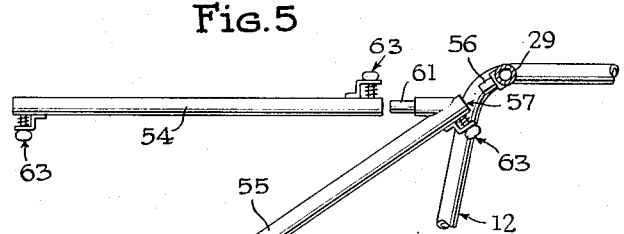
Fig. 5 is an exploded view showing the removable strut members.

A transverse hinge 53 affords an axis about which the portions 11 and 12 may be swung from the normal operating position (Fig. 1) to the folded position (Fig. 4). Detachable struts 54 and 55 react between the front and rear portions 11 and 12 when the vehicle is in its operating position. The member 29 is provided with a stud 56 which engages a socket 57 in one end of strut 55 (see Fig. 5). A socket 58 in the other end of the strut 55 engages a stud 59 provided on transverse member 17. The strut 55 is provided with a stud 61, disposed at an angle thereto, which is adapted to receive one end of the strut 54. A stud 62 is likewise provided on the steering head 18 and receives the other end of strut 54. The struts 54 and 55 are held in assembled relation with the frame by latching means indicated by reference numeral 63.

The construction of latch means 63 is shown in Fig. 6 as applied to the connection between the strut 54 and the steering head 18. Stud 62 and strut 54 are provided with alined radial holes which receive a pin 64 axially movable in a bracket 65 mounted on strut 54. A stop pin 66 extending transversely of pin 64 serves to limit the entrance of pin 64. The stop pin 66 also serves as a stop for the washer 67 which in turn serves as a seat for the coil spring 68 biased between this washer and the bracket 65. It will be seen that the pin 64 is biased toward its locking position. The latches 25 and 28 are similarly constructed. Other suitable latching means could be substituted for the type shown.

A valve operating rod 69 extends forwardly from the valve 41 through a guide member 72. The rod 69 projects beyond the front face of the portion 12 when the valve 41 is open. It is moved back to close the valve when the vehicle is folded. A cushion 73 is carried on the upper face of the portion 12 and is adapted to be easily removed.

Referring to Fig. 1 it will be apparent that the struts 54 and 55 serve to hold the portions 11 and 12 against swinging motion about the hinge 53. These struts may be removed by releasing the latches 63. In folding the vehicle it is preferable to remove the cushion from the portion 12 and place it underneath the front of this portion, before the latches 63 are released. After the struts 54 and 55 have been removed, they may conveniently be placed in the rear portion 12. The latch 25 may be released, thus permitting the fork and wheel assembly 24 to be detached from the steering column 23. This assembly is also placed in the portion 12 next to the engine 36. The latches 28 may be released and handle bars 27 folded forward about the hinge axes 30. The steering column 23 and the folded handle bars 27 are then turned 180°. The front portion 11 is then lifted and swings about the hinge 53 to the position shown in Fig. 4. The component parts are relatively so dimensioned that a compact folded unit is afforded. It will be seen that forward portion 11 conforms generally with the outline of the forward, upper and rear faces of the portion 12. When the vehicle is folded the front and rear portions nest with one another. It will be noticed that no voids exist between the two portions when folded and also that the rear portion of the vehicle is substantially filled. The platform 21 which overlies the forward face of the portion 12 when the vehicle is folded, engages the rod 69 as the vehicle is folded and moves it rearward thus closing the fuel supply valve 41.

Although the preferred embodiment of the invention has been described in detail, no limitation to this embodiment is intended other than is expressed in the appended claims.

I claim:

1. In a motor driven vehicle the combination of a front frame portion, a rear frame portion; a platform carried by said front portion; a steering head attached to said front portion; a steering column journaled in said head; a front wheel and fork assembly releasably attached to said column; a steering element for said column; said rear portion comprising tubular members defining an openwork frame having quadrilateral side surfaces; an internal combustion engine mounted in said openwork frame; a road wheel driven by said engine and mounted on said frame near the lower rear corner thereof; fuel supply means for said engine; valve means controlling said fuel supply; valve actuating means; a transverse hinge connecting said front and rear portions, about which said portions may be swung selectively to a normal operating position and to a folded position; means retaining said portions in said normal operating position and releasable to permit swinging motion of said portions about said hinge, said valve actuating means being engaged by said front portion when said vehicle is folded whereby said valve is closed.

2. A folding vehicle comprising in combination; a rear frame portion comprising a box-like frame; a motor and road wheel unit mounted on said frame portion, a hinge at the lower front margin of said rear portion, said hinge having a horizontal axis; a front portion attached to said hinge and comprising a platform frame member and a steering head in angular relation to each other; a steering column rotatably mounted in said steering head; a front road wheel mounted on said column; and a pair of handle bars secured to the upper end of said column and lying in a plane angularly related to the axis of the column, the contour of the rear frame portion, the angles above recited and the dimensions of the two frame portions being so chosen that when folded the platform frame member overlays substantially the entire front face of said box-like frame, said steering column and steering head overlay the top face of said box-like frame and said handle bars overlay the rear face of said box-like frame; and means operable to secure said portions in a normal operating position.

3. The combination defined in claim 2 including a fork member attached to the column and in which said front wheel is mounted, said front wheel and fork being removable as an assembly and so dimensioned relatively to said box-like frame as to be received therein.

4. The combination defined in claim 2 in which said motor and road wheel unit comprises an internal combustion engine, a road wheel driven thereby, and fuel supply means; and a valve to control said fuel supply means; and means engaged by said front frame portion and effective to close said valve as said vehicle is folded.

5. A power driven vehicle having a normal operating position and a folded position comprising in combination a front frame portion and a rear frame portion; a steering head carried by said front frame portion; a steering column journaled in said head; a steering element secured to said steering column; a front wheel and fork assembly detachably secured to said column, said rear portion including a box-like frame; a propulsion unit mounted in said box-like frame; a rear wheel driven by said propulsion unit and carried by said rear frame portion; a hinge connecting said portions and affording a horizontal hinge axis normal to the longitudinal centerline of the vehicle about which said portions may be moved upward from said normal operating position to said folded position, said rear portion being received in nesting relation with said front portion when the vehicle is in the folded position; and means selectively positioned to secure said portions against swinging about said hinge away from their normal operating position and to permit said portions to swing about said hinge, said propulsion unit being so located in said box-like frame as to define a space between it and the faces of said box-like frame, said space being so dimensioned relatively to said front wheel and fork assembly as to receive the latter substantially entirely therein.

6. A power driven vehicle having a normal operating position and a folded position comprising in combination a front frame portion and a rear frame portion; a steering head carried by said front portion; a steering column journaled in said head; a steering element attached to said column; a front wheel and fork assembly secured to said column; an internal combustion engine; a fuel tank; a fuel supply line leading from said tank to said engine; a valve in said line to control the flow of fuel therethrough; a rear road wheel driven by said engine, said engine, tank and rear wheel being carried by said rear portion; a transverse hinge connecting said portions and affording a hinge axis normal to the longitudinal centerline of said vehicle about which said portions may be moved upward from said normal operating position to said folded position; means selectively positioned to secure said portions against swinging about said hinge away from their normal operating positions and to permit said portions to swing about said hinge; and an actuating member for said valve, said member being engaged by said front portion when said vehicle is in said folded position whereby said valve is maintained in closed position.

References Cited in the file of this patent

UNITED STATES PATENTS

| Number | Name | Date |
|---|---|---|
| 1,218,943 | Hudry | Mar. 13, 1917 |
| 2,445,058 | Fields | July 13, 1948 |
| 2,594,034 | King | Apr. 22, 1952 |

FOREIGN PATENTS

| Number | Country | Date |
|---|---|---|
| 526,773 | Great Britain | Sept. 25, 1940 |
| 867,505 | France | Aug. 4, 1941 |